Dec. 18, 1951  L. G. BARRY  2,579,169
INDEXING MECHANISM
Filed July 20, 1950  2 SHEETS—SHEET 1
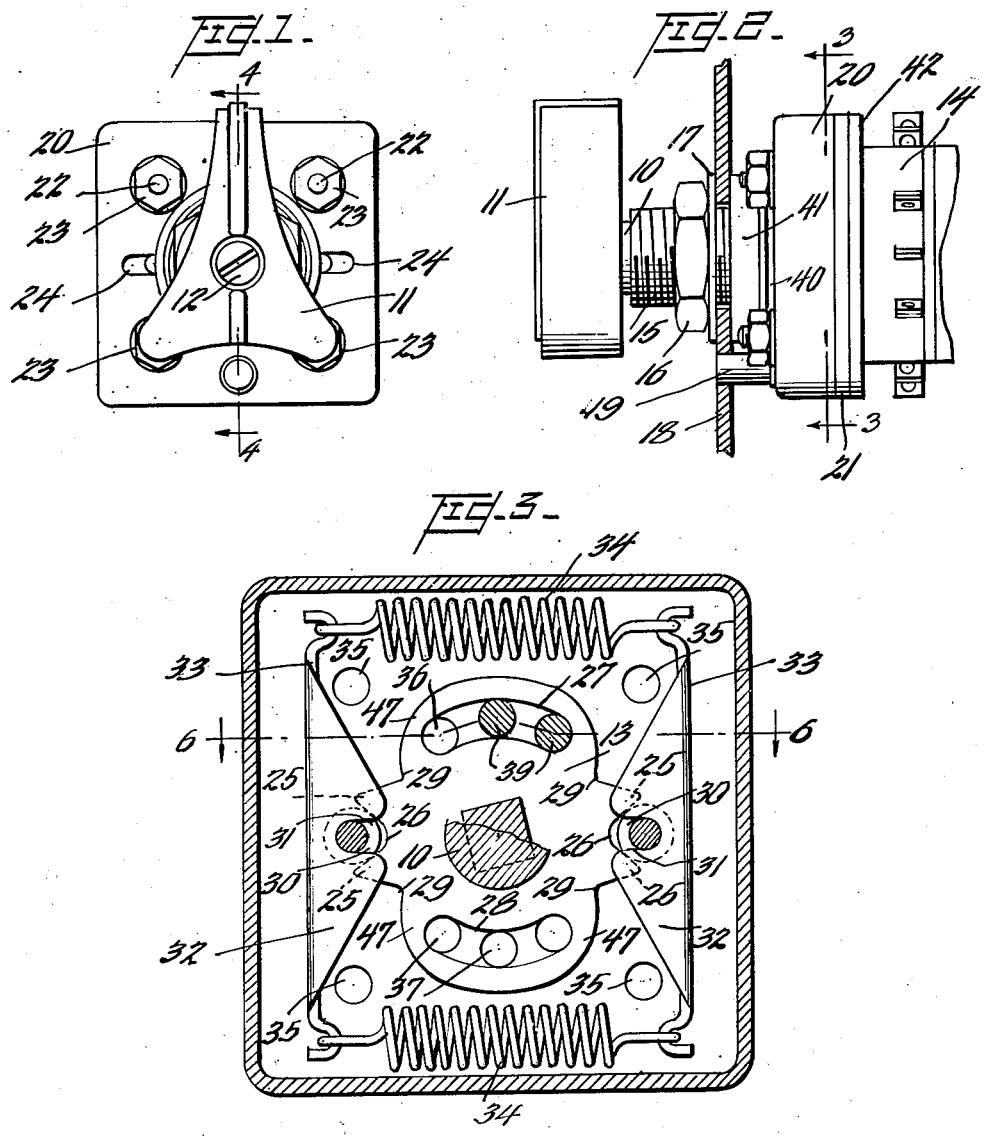
INVENTOR
Leon George Barry
BY Watson, Cole, Grindle & Watson
ATTORNEYS Dec. 18, 1951     L. G. BARRY     2,579,169
INDEXING MECHANISM
Filed July 20, 1950     2 SHEETS—SHEET 2
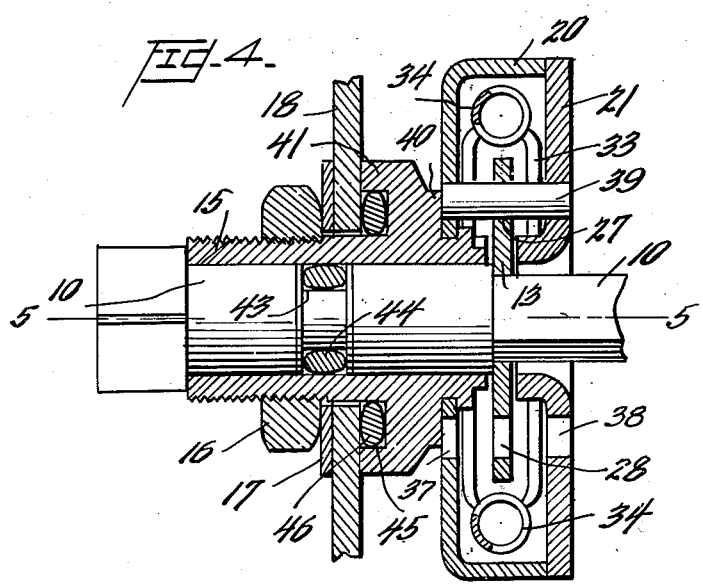
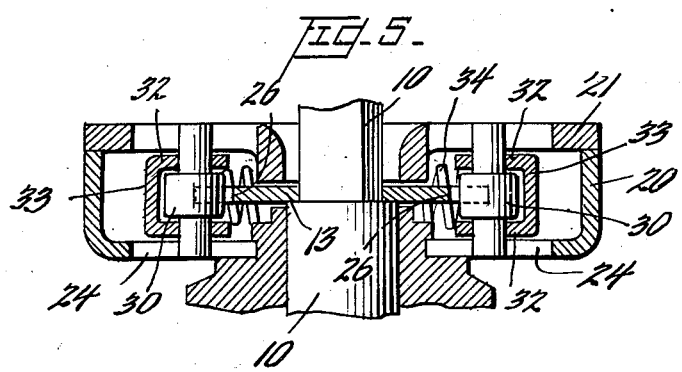
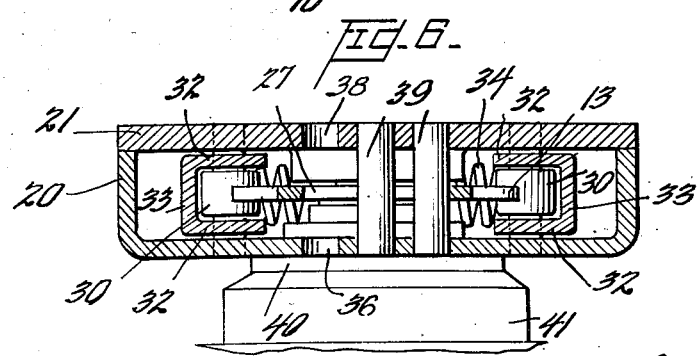
INVENTOR
Leon George Barry
BY
Watson, Cole, Grindle & Watson
ATTORNEYS Patented Dec. 18, 1951

2,579,169

UNITED STATES PATENT OFFICE 2,579,169

INDEXING MECHANISM

Leon G. Barry, Whippany, N. J., assignor to United States Instrument Corporation, Summit, N. J., a corporation of New Jersey Application July 20, 1950, Serial No. 174,879

6 Claims. (Cl. 74—527)

This invention relates to indexing mechanism, and more particularly to a device for use with a rotary switch for indexing the same to any of three positions, with a spring return from one of said positions if desired.

It is the general object of the present invention to provide an indexing mechanism for association with a rotary switch of double-throw or triple-throw character, the indexing device comprising, in general, a cam secured on the shaft upon which the switch rotor also is secured, and one or more cam followers, the periphery of the cam being formed to provide three positive detent positions, and having stop means associated therewith to limit the oscillatory movements of the cam so that it cannot oscillate beyond the said three positions.

A further object of the invention is the provision of an indexing mechanism of the character described, including one or more stops comprising a member extending into or through grooves or slots in the cam, the positions of the stop members being adjustable relative to the ends of the slots or grooves with which they are associated, in order to provide for variable fixed adjustments of the indexing mechanism with regard to the positions which it may assume and which, accordingly, the associated rotary switch may assume.

More specifically, it is an object of the invention to provide an indexing mechanism comprising a cam having a toothed periphery, one or more cam followers yieldably urged against the periphery of said cam, and stop members extending into or through grooves or slots formed in said cam, whereby the indexing mechanism may be adjusted to provide either two or three positive detent positions, and wherein if it is desired to do so, one of the said three positions may be positively eliminated, the eliminated position being either the first or third of the series, as desired.

A further object is the provision of an indexing mechanism of the character described wherein, if desired, the third position, i. e., the position at either end of the series of three positions, may be made a "spring return" position instead of a positive detent position or, in other words, adjustment may be made whereby the switch or other mechanism associated with the indexing device will, if rotated to the specified position, be automatically returned through spring action to the adjacent position when the turning force is removed from the shaft of the indexing mechanism.

A further object is the provision of an indexing mechanism of simple and inexpensive, rugged construction, having the advantages aforesaid.

Other and further objects, features and advantages will be apparent from the description which follows, read in connection with the accompanying drawings in which Figure 1 is a front elevation of an indexing mechanism constructed according to the invention;

Figure 2 is a side elevation of the indexing mechanism;

Figure 3 is a sectional view on line 3—3 of Figure 2;

Figure 4 is an enlarged sectional view on line 4—4 of Figure 1;

Figure 5 is a sectional view on line 5—5 of Figure 4;

Figure 6 is a sectional view on line 6—6 of Figure 3; and

Figure 7 is an enlarged perspective view of an element of the mechanism, namely, a yoke which embraces and retains a cam follower roller.

In order to facilitate an understanding of the invention, reference is made to the embodiment thereof shown in the accompanying drawings and detailed descriptive language is employed. It will nevertheless be understood that no limitation of the invention is thereby intended and that various changes and alterations are contemplated such as would ordinarily occur to one skilled in the art to which the invention relates.

Referring to Figures 1 to 4, inclusive, the mechanism comprises a shaft 10 on which a knob 11 of suitable conformation is secured by means of a screw 12 and on which is likewise secured a cam 13 and a switch or other mechanism to be indexed as indicated at 14 in Figure 2. The shaft 10 extends through a bushing 15 (Figure 2) by means of which, together with the nut 16 and washer 17, the device may conveniently be mounted on and through a panel 18, the positioning of the device about its axis being facilitated by means of a positioning pin 19 extending into an appropriate aperture in the panel 18. The cam and cam followers to be described are preferably enclosed within a cover 20 fitting against a back plate 21 and held in position by means of through-bolts 22 and nuts 23, or any other suitable means. The front face of the cover 20 is provided with laterally extending slots 24 (Figure 1) for the purpose to be described.

Referring now to Figure 3, it will be seen that the cam 13 is of generally oval configuration and is provided at either side with a pair of teeth 25 spaced by a valley 26, and toward its upper and lower margins is provided with arcuate slots 27, 28 extending entirely through the cam. Adjacent the remote sides of the teeth 25, i. e., the sides away from the valley 26, the periphery of the cam is provided with valleys 29, the valley 26 and the two valleys 29, on either side of the cam, forming a set of three adjacent and equally spaced valleys into which the cam followers, to be described, may seat.

The cam follower mechanism comprises, on either side of the cam 13, a roller 30 trunnioned in suitable slots 31 of the opposite webs 32 of a yoke 33. Preferably, the trunnions of rollers 30 extend outwardly into the slots 24 formed in the cover 20 and back plate 21, in order that the cam followers may be guided in their movements. Adjacent ends of the two yokes 33 are connected by tension springs 34 which urge the cam follower rollers 30 into engagement with the periphery of the cam 13 and also, together with the engagement between the trunnions of the rollers 30 and the slots 24 of the cover 20, serve to secure the entire cam follower assembly in operative position, eliminating the necessity of employing further means for this purpose.

The apertures 35 provided in the cover 20 as seen in Figure 3 are for accommodation of the bolts 22. The cover 20 is also provided with two groups of apertures 36, 37 each in arcuate arrangement, which may be seen through the slots 27, 28 of the cam 13 in Figure 3 and the back plate 21 is provided with similar groups of apertures, one of which may be seen at 38 in Figure 6. The said apertures are designed to receive pins or stop members 39 which extend through the slots 27 and/or 28, as the case may be, and may be varied in arrangement within the said slots for the purposes to be described. In each instance it is contemplated to employ two pins or stop members 39, but they may be positioned in any two of the six apertures of the groups 36, 37 of the cover and corresponding apertures 38 of the back plate. The pins 39 are retained between a shoulder 40 formed on the hub 41 (Figure 4) and a suitable plate 42 forming a part of the switch 14 or other mechanism associated with the indexing mechanism and secured on the shaft 10.

If for any reason it is desired to render the construction waterproof, the shaft 10 may be provided with an annular groove 43 as seen in Figure 4 in which is mounted an elastic sealing ring 44 and the hub 41 may likewise be provided with a circular groove 45 accommodating an elastic sealing ring 46.

The operation of the device will now be described. If it is desired, for example, to provide two positive detent positions and to exclude the third position entirely, the pins 39 may be arranged as seen in Figures 3 and 6, in which case the cam 13 may only oscillate between the position which it occupies in Figure 3 and the next position clockwise, in either of which positions the mechanism will remain unless positively moved to the other of such positions.

If, on the other hand, it is desired to have three positive detent positions, the pins 39 may be positioned in the central apertures of the groups 36 and 37, respectively. Again, if it is desired to have two positive detent positions and one "spring-return" position, the pins 39 may be placed in the left-hand aperture of the group 36 and right-hand aperture of the group 37, respectively. When the pins 39 are in these positions, the cam 13 may be rotated counterclockwise from the position shown in Figure 3 to a further positive detent position represented by the upper valley 29 on the left of the cam and the lower valley 29 on the right of the cam as seen in Figure 3, but further rotation in a counterclockwise direction will result in the cam followers riding up onto the shoulders 47 of the cam, where they will not be retained but will return to the valleys 29 as soon as the turning force on the shaft 10 is removed. By reverse arrangements of the pins 39, reverse movements of the cam 13 may be achieved.

It is of course contemplated that indexing mechanisms according to the invention will be adjusted at the factory for the particular use to which they are to be put and that the pins 39, once in place, will not be re-adjusted from time to time. However, such adjustment in the field is possible, if necessary.

Having thus described the invention, what is claimed as new and desired to be obtained by Letters Patent is:

1. Indexing mechanism comprising a shaft supported for oscillatory movement, a cam secured on said shaft, said cam being slotted and having a toothed periphery, a cam follower engaging said periphery, means yieldably urging said cam follower into engagement with said cam, a fixed stop member extending into said slot, and means for securing said stop member in one of several fixed positions for limiting the oscillatory movements of said cam by engagement between said stop member and the respective ends of said slot.

2. Indexing mechanism as defined in claim 1, the periphery of said cam being formed with two teeth spaced by a valley adapted to receive said cam follower in close engagement, and a valley adjacent the remote side of each tooth, the extent of the slot in said cam being such that said cam may oscillate only so far as to permit said cam follower to occupy any of said three valleys.

3. Indexing mechanism as defined in claim 1, including a second fixed stop member extending through said slot and secured in any of said several positions not occupied by said first stop member.

4. Indexing mechanism as defined in claim 1, the periphery of said cam being formed at each of two opposite areas with two adjacent teeth spaced by a valley and with a valley adjacent the remote side of each said tooth, said mechanism comprising a cam follower in association with each set of valleys, and means yieldably urging each said cam follower into engagement with said cam.

5. Indexing mechanism as defined in claim 1, the periphery of said cam being formed at each of the two opposite areas with two adjacent teeth spaced by a valley and with a valley adjacent the remote side of each said tooth, said mechanism comprising a cam follower in association with each set of valleys, and means yieldably urging each said cam follower into engagement with said cam, said last means comprising a yoke embracing each said cam follower, and spring means connecting the adjacent ends of the respective yokes.

6. Indexing mechanism as defined in claim 1, said cam having two slots, said mechanism comprising a fixed stop member extending into each of said slots and means for securing each of said stop members in one of several fixed positions relative to the ends of the slot into which it extends.

LEON G. BARRY.

REFERENCES CITED

The following references are of record in the file of this patent:

UNITED STATES PATENTS

| Number | Name | Date |
|---|---|---|
| 1,115,130 | Theis | Oct. 27, 1914 |
| 2,153,430 | Newman | Apr. 4, 1939 |
| 2,155,594 | Hart | Apr. 25, 1939 |
| 2,226,719 | Hall | Dec. 31, 1940 |
| 2,239,445 | Martin | Apr. 22, 1941 |

FOREIGN PATENTS

| Number | Country | Date |
|---|---|---|
| 253,811 | Switzerland | Dec. 1, 1948 |
| 280,101 | Germany | Nov. 5, 1914 |
| 637,069 | Germany | Oct. 20, 1936 |